ELECTRICAL CONTACT ASSEMBLY FOR COMPRESSION BONDED ELECTRICAL DEVICES
Filed March 21, 1966
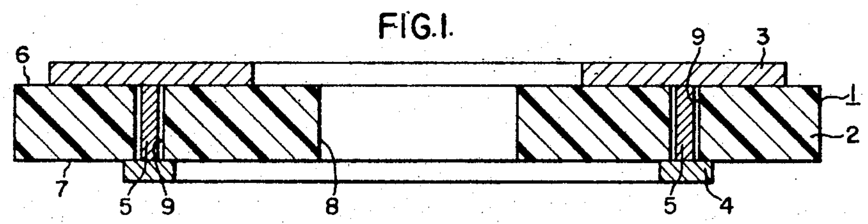
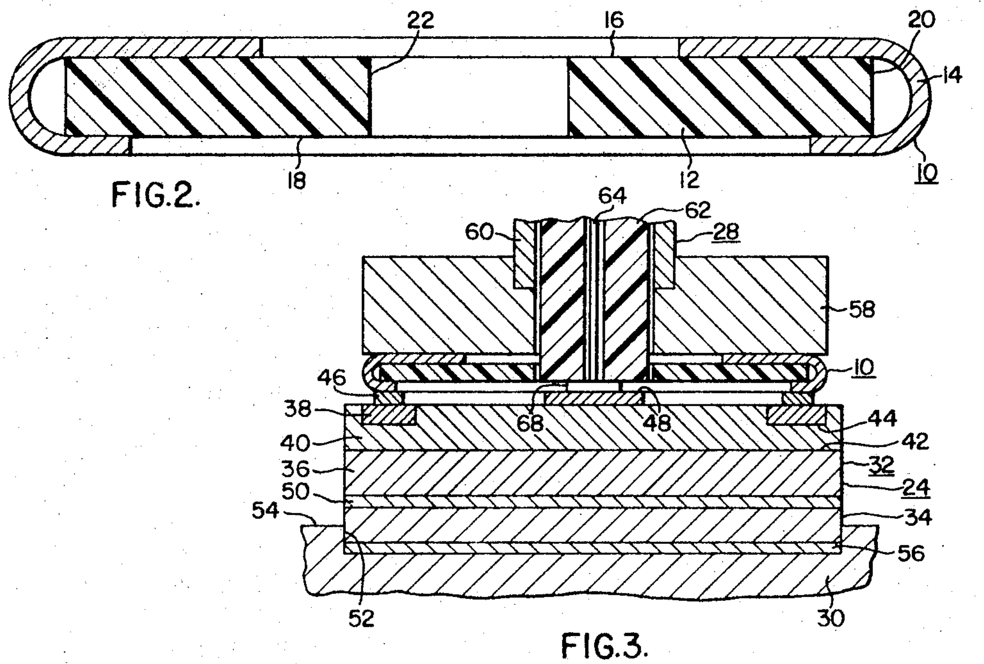
FIG.2. FIG.3.
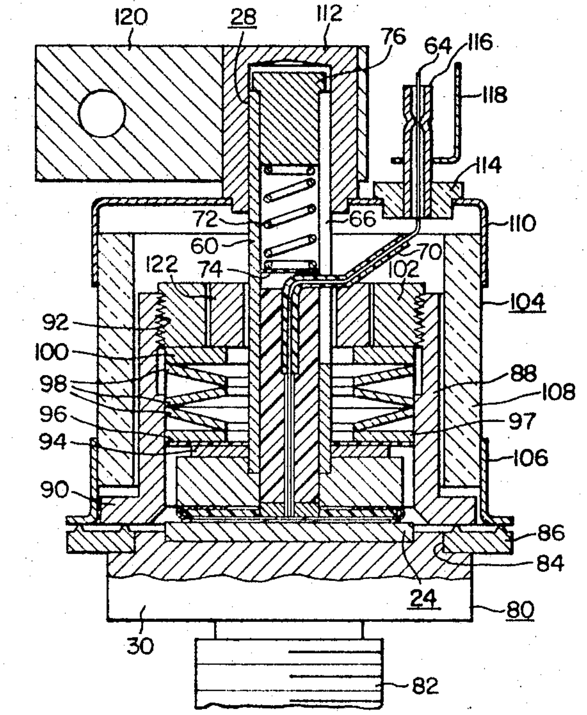
FIG.4.
INVENTORS
John J. Steinmetz, Jr, Herbert E. Ferree
and Thomas P. Nowalk
BY
C. L. Menzemer
ATTORNEY United States Patent Office 3,463,976

Patented Aug. 26, 1969

3,463,976

ELECTRICAL CONTACT ASSEMBLY FOR COMPRESSION BONDED ELECTRICAL DEVICES

John J. Steinmetz, Jr., Monroeville, and Herbert E. Ferree and Thomas P. Nowalk, Hempfield Township, Greensburg, Pa., assignors to Westinghouse Electric Corporation, Pittsburgh, Pa., a corporation of Pennsylvania Filed Mar. 21, 1966, Ser. No. 535,838
Int. Cl. H01l *11/00, 15/00*
U.S. Cl. 317—235 3 Claims

ABSTRACT OF THE DISCLOSURE

An electrical device has a contact assembly in electrical and physical contact with a semiconductor element of the device. The contact assembly comprises a partially restrictive, readily deformable cushioning member having good electrically and thermally conductive contact metal disposed on at least a portion of each of two opposed surfaces and electrically connected to each other. Under a force exerted on the contact assembly within the device, the cushioning member restrictively flows to mold itself about the contours of the surfaces in which it is in contact at the time. Thus, the cushioning member enables the force acting on the contact assembly to be uniformly distributed over the surface of the semiconductor element in electrical and physical contact therewith.

The invention described herein was made in the performance of work under a NASA contract and is subject to the provisions of Section 305 of The National Aeronautics and Space Act of 1958, Public Law 85–568 (72 Stat. 435; 42 U.S.C. 2457).

This invention relates to an electrical contact assembly suitable for use in compression bonded electrical devices.

In compression bonded electrical devices, a large number of the connections between the electrical contacts and the semiconductor element are maintained by compressive means. There is no third material used to establish a physical joining of the electrical lead to a corresponding electrode surface on the element. Electrical contact must be maintained between the electrical lead and the electrode without any unusually high localized stress concentrations causing a premature operating failure of the semiconductor element.

An object of this invention is to provide an electrical contact assembly comprising a partially deformable, cushioning member and suitable for use in compression bonded electrical devices.

Other objects of this invention will, in part, be obvious and will, in part, appear hereinafter.

In order to more fully understand the nature and objects of this invention, reference should be had to the following description and drawings, in which:

FIGURE 1 is a view, partially in cross-section of an electrical contact assembly made in accordance with the teachings of this invention;

FIG. 2 is a view, partially in cross-section of a preferred electrical contact assembly embodying the teachings of this invention;

FIG. 3 is a side view, partially in cross-section of a portion of an electrical device embodying the contact assembly of FIG. 1; and FIG. 4 is a side view, partly in cross-section, of a compression bonded electrical device embodying the portion of the electrical device shown in FIG. 3.

In accordance with the present invention and in attainment of the foregoing objects, there is provided an electrical contact assembly comprising a partially deformable cushioning member, the member having a top surface and a bottom surface, a first electrically and thermally conductive contact disposed on at least a portion of the top surface of the member and a second electrically and thermally conductive contact disposed on at least a portion of the bottom surface of the member, the first and second contacts being in an electrical and thermal conductivity relationship with each other.

In order to more fully describe the invention, and for no other purpose, particular reference will be made to a compression bonded electrical device embodying a semiconductor element having two electrical contact surfaces on one major surface of the element and utilizing an electrical contact assembly made in accordance with the teachings of this invention.

It is to be noted that the electrical contact assembly described herein may also be fabricated having other geometrical shapes and having either none, one, or more than one apertures in the assembly depending on the electrical device in which it is to be employed.

With reference to FIG. 1 there is shown an electrical contact assembly 1 made in accordance with the teachings of this invention. The assembly 1 comprises a readily deformable cushioning member 2, a first electrically and thermally conductive contact member 3, a second electrically and thermally conductive contact member 4, and a plurality of electrically and thermally conductive members 5.

The cushioning member 2 is made of an electrically nonconducting material and has a top surface 6, a bottom surface 7, a centrally disposed aperture 8 and a plurality of apertures 9. The apertures 8 and 9 extend completely between the top surface 6 and the bottom surface 7 of the member 2.

The contact members 3 and 4 consist of an electrically and thermally conductive metal such, for example, as silver. The contact members 3 and 4 are each disposed on at least a portion of the respective surfaces 6 and 7. The contact members 3 and 4 are connected to each other by the members 5 disposed in the apertures 9. The members 5 consist of such suitable electrically conductive members, such for example, as flexible electrical conductors or electrically conductive springs.

With reference to FIG. 2 there is shown a preferred electrical contact assembly 10 embodying the teachings of this invention. The assembly 10 is a modification of the contact assembly 1 shown in FIG. 1. The assembly 10 comprises an apertured cushioning member 12 and an electrically and thermally conductive contact member 14.

The member 12 has a top surface 16, a bottom surface 18, a peripheral edge 20 and an aperture 22 extending entirely through the member 12 from the top surface 16 to the bottom surface 18.

The member 12 consists of a material which compensates for any uneven surface area with which either, or both, of the surfaces 16 and 18, comes into contact. The material has physical properties which will allow it to cold flow under pressure. The cold flow proceeds only to a given limit and then essentially ceases whereupon the member 12 acts as a rigid member.

Upon assuming the property of a rigid member, the material of the member 12 continually transmits any force applied to either surface 16 or 18 without any appreciable cold flowing occurring. At a temperature level as high as from 200° C. to 250° C., but preferably lower, and under a pressure preferably exceeding 800 pounds per square inch, the allowable further deformation of the member 12 must be as little as possible in order to protect the functional reliability of the electrical device ultilizing the member 12.

Preferred materials for the member 12 having the desired properties mentioned above are polytetrafluoroethylene and trifluoromonochloroethylene. These two materials in addition to having the desired properties, also are good electrically insulating materials for the operating range of electrical devices up to approximately 250° C.

The surfaces 16 and 18 of the member 12 are two major surfaces opposed to, and substantially parallel to each other. The electrically and thermally conductive contact member 14 is disposed about the outer periphery, and on a portion of each of the outer peripheral portions of the major surfaces, of the member 12. The member 14 is designed to leave a space between the outer peripheral edge 20 of the washer 12 and the contact member 14. This space permits the member 12 under pressure to have freedom of movement to flow in all directions.

The contact member 14 comprises a metal selected from the group consisting of copper, gold, silver, nickel, tin, indium and base alloys thereof.

When a force is applied to the contact assembly 10, the member 12, being under pressure, flows in all directions. The surfaces 16 and 18 of the member 12 flow until they conform to all those portions of surfaces in physical contact with them particularly, the surfaces of the contact member 14. The surfaces 16 and 18 of the member 12 flow about portions of the contact member 14 until the outside surface of the member 14 and the surfaces 16 and 18 of the member 12 are essentially in the same plane. Meanwhile other portions of the member 12 flow to partially fill the space defined by the outer peripheral edge 20 of the member 12 and portions of the inner surface of the contact member 14.

With reference to FIG. 3, there is shown a portion of a compression bonded electrical device embodying the contact assembly 10.

The portion of the compression bonded electrical device comprises a semiconductor assembly 24, the contact assembly 10, a multiple electrical contact assembly 28 and base 30 of a case.

The semiconductor assembly 24 comprises a semiconductor element 32, an electrical contact 34 and a layer 56 of a malleable electrically and thermally conductive metal.

The semiconductor element 32 comprises a body of a semiconductor material selected from the group consisting of silicon, silicon carbide, germanium, compounds of Group III and Group V elements, and compounds of Group II and Group VI elements. The element 32 has two regions 36 and 38 of a first type semiconductivity and one region 40 of a second type semiconductivity, a p-n junction 42 between regions 36 and 40, and a p-n junction 44 between regions 38 and 40.

An annular electrical contact 46 is disposed on an outer peripheral portion of the element 32 in an electrically conductive relationship with the region 38 of first type semiconductivity. A button type electrical contact 48 is centrally disposed on the same surface of the element 32 as the contact 46 and in an electrically conductive relationship with the region 40 of second type semiconductivity.

The element 32 is joined to the electrical contact 34 with a suitable solder layer 50 comprising such, for example, as a silver-lead-antimony solder alloy.

The electrical contact 34 has a thermal expansion characteristic closely matched to the semiconductor element 32. The contact 34 also is a firm support for the element 32. The contact 34 comprises a metal selected from the group consisting of molybdenum, tungsten, tantalum and base alloys thereof.

The contact 34 is disposed in a recess 52 within a top surface 54 of the base 30 with the layer 56 of a malleable, electrically and thermally conductive metal selected from the group consisting of gold, silver, tin, and aluminum positioned between the contact 34 and the surface of the recess 52 within the base 30.

Assembly 28 comprises a copper washer 58 brazed to a hollow electrical connector 60 extending upwardly from the washer 58. An electrically insulating plug 62 is slidably mounted inside the hollow connector 60.

Referring to FIG. 4 in part, a first electrical lead 64 extends through a slot 66 in the side wall of the hollow connector 60 and down through the center of the plug 62 and terminates in a button-shaped contact member 68, FIG. 3. A layer 70 of electrical insulation is disposed about the lead 64 and the lower end of the insulation layer 70 is sealed within the plug 62.

A force is maintained on the button-shaped contact member 68 by means of a coil spring 72 which is positioned within the hollow connector 60.

A mica washer 74 is positioned between the plug 62 and the spring 72. The mica washer 74 protects the insulation 70 on the electrical lead 64 from wear and damage by the spring 72 thereby preventing any accidental electrical short- circuiting between the connector 60, through the spring 72, and the lead 64.

The spring 72 is maintained in compression by a plug 76 which fits tightly into the upper end of the hollow connector 60. The spring 72 maintains a constant force of from not less than 3 to 5 pounds on the button-shaped contact member 68 when it is in contact with the contact 48.

Referring again to FIG. 3, the electrical contact assembly 10 is disposed between the copper washer 58 and the contact 46. A portion of the plug 62 projects through the aperture 22 of the member 12. When a force is applied to the contact assembly 28, the washer 58 is forced into electrical contact with the contact member 14 of the contact assembly 10, which, in turn is then forced into an electrical contact with the electrical contact 46. The applied force causes the member 12 to partially flow until it reaches its semi-rigid state. Before reaching its semi-rigid state, the member 12 flows enough to mold itself to all opposing surfaces adjacent to the surfaces 16 and 18 of the member 12. Upon reaching the semi-rigid state the member 12 transmits the applied force uniformly distributed over the surface of element 32 and the element's contact 46 whereby electrical contact is maintained between the washer 58 and the contact 46 by the contact member 14 of the contact assembly 10.

Upon application of the force, the contact 68 at the end of the lead 64 and the electrical contact 48 of the element 32 are also electrically connected. The contact 68 forces the plug 62 to slide upwardly within the hollow connector 60 thereby compressing the spring 72 FIG. 4. The spring 72 provides a positive means for maintaining the electrical connection between the contacts 68 and 48.

With reference to FIG. 4, there is shown a compression bonded electrical device 80 which comprises in part the portion of the electrical device shown in FIG. 3 and hereinbefore described.

The device 80 comprises the pedestal 30 which may be made of copper, brass, aluminum or any other suitable electricaly and thermally conducting material. The pedestal 30 has at its lower end a screw-threaded portion 82 for assembling the device 80 into electrical apparatus. The pedestal 30 is provided with a peripheral shoulder 84 to which a weld ring 86 is attached by suitable means such, for example, as a layer of silver braze material (not shown).

An inner case 88 having an outwardly extending flange portion 90 at its lower end and an internally threaded upper portion 92 is joined to the weld ring 86 at the flange portion 90. The semiconductor assembly 24 is placed in the recess 52 of the pedestal 30 and within the inner case 88. The contact assembly 10 and the multiple electrical contact assembly 28 are then each respectively disposed within the inner case 88 and on the semiconductor assembly 24.

A first metal thrust washer 94 is placed on top of the washer 58, an electrical insulating washer 96 is placed over the hollow connector 60 of the contact assembly 28 and disposed on top of the thrust washer 94. A second metal thrust washer 97 is disposed on top of the insulating washer 96. At least one convex spring washer 98 is placed over the hollow connector 60 and disposed on the thrust washer 97. A third metal thrust washer 100 is placed over the hollow connector 60 and disposed on the spring washer 98.

A predetermined force is applied to the third metal thrust washer 100 to resiliently urge the multiple contact assembly 28, the contact assembly 10, the semiconductor assembly 24 and the pedestal portion 30 into an electrical and thermal conductive relationship. While maintaining the predetermined force application, an externally threaded apertured plug 102 is placed over the hollow connector 60 and screwed down into the inner case 88 to retain the desired predetermined force.

After the device 80 has been assembled in the manner described above, the entire assembly is enclosed within a header 104.

The header 104 comprises a weld flange 106, ceramic side walls 108, a metal top plate 110, a metal cup shape member 112, a ceramic insulator 114, a metallic tube 116, a first electrical connecting tab 118 and a second electrical connecting tab 120. The housing 104 is joined to the weld ring 86 through the weld flange 106.

The lead 64 passes upwardly through the metallic tube 116. The metallic tube 116 is then sealed to provide a hermetic seal for all the components within the housing 104.

The second electrical connecting tab 120 and the cup shape member 112 are crimped about the upper portion of the hollow connector 60 in the area of the plug 76 to provide an electrical connecting means between a portion of the contact assembly 28 and an electrical circuit external to the device 80.

Although not required, it is preferred that an apertured molecular sieve 122 is disposed about the hollow connector 60, seated on the third metal thrust washer 100 and within the aperture of the threaded plug 102. The sieve 122 serves as a moisture gettering device.

The following example is illustrative of the teachings of this invention:

A good electrically and thermally conductive massive metal member having an integral threaded stud was prepared from a piece of copper alloy. The finished machined configuration was the same as illustrated in FIG. 4. A steel weld ring was silver brazed to the massive metal member. A steel inner case was resistance welded to the steel weld ring.

A layer of silver was then disposed within the inner case and positioned in the recess of the top surface of the pedestal portion of the massive metal member.

A silicon semiconductor transistor element was prepared. The element consisted of a first major region of n-type semiconductivity and a second major region of p-type semiconductivity. An annular region of n-type semiconductivity was formed in the region of p-type semiconductivity. An exposed surface of major proportion of the p-type semiconductivity and an exposed surface of the annular region of n-type semiconductivity comprised the top surface of the element.

Employing suitable masking techniques and a metal evaporation chamber, an annular aluminum electrical contact and a centrally disposed aluminum electrical contact disc, were each vapor deposited on the exposed surfaces of the respective n-type and p-type regions of the top surface of the element. Each contact was 30,000 Angstrom units in thickness.

The thickness and the configuration of the contacts caused the top surface of the element to be uneven.

The semiconductor element was affixed to a molybdenum electrical contact by disposing a layer of Ag-Pb-Sb alloy electrical solder material between the bottom surface of the element and the top surface of the contact. The element and the contact, each affixed to each other, was then disposed on the layer of silver within the recess of the pedestal.

To fabricate the multiple contact assembly, a slot was machined in the wall of a small length of copper tubing which comprised the hollow electrical connector. The slot extended from one end of the tubing almost to the other end. The tubing was then brazed to a copper washer.

A piece of polytetrafluoroethylene was machined to configuration shown in FIG. 4 to produce the electrically insulated plug. The lead, with the button shaped electrical contact, which was disposed in the plug was made of silver. The insulating jacket for the silver lead was made of polytetrafluoroethylene. The lead was formed to protrude out through the slot in the hollow connector.

A copper plug was inserted into the open end of the hollow connector and then crimped in several locations to retain it permanently in place. A steel coil spring was then disposed within the hollow connector and seated on the copper plug. A mica washer was then disposed on the spring within the hollow connector. The electrical lead and the electrically insulated plug was then disposed within the connector on the mica washer with the portion of the plug containing the button shape contact of the lead projecting through the aperture of the copper washer.

An electrical contact assembly was fabricated by forming a piece of silver metal into an electrical contact covering the outer peripheral portions of both the top and the bottom surfaces of an apertured polytetrafluoroethylene cushioning member 0.030 inch in thickness. The aperture of the cushioning member was slightly larger than the portion of the plug of the multiple contact assembly which protruded through the aperture.

The electrical contact assembly was disposed on the semiconductor element within the inner case and with the silver electrical contact in contact with the annular electrical contact of the element. The multiple electrical contact assembly was disposed on the electrical contact assembly with the copper washer in contact with the silver electrical contact of the contact assembly. The plug, meanwhile projected through the aperture of the cushioning member of the contact assembly placing the button shaped contact of the electrical lead in contact with the centrally disposed electrical contact disc of the semiconductor element.

An apertured metal thrust washer and an apertured mica washer were each placed about the hollow connector, on the copper washer. A second steel apertured thrust washer was placed on top of the mica washer. Three steel apertured spring washers and a third steel apertured thrust washer were each disposed in turn on the second steel apertured thrust washer.

A force was applied to the uppermost metal apertured thrust washer to force all the components together into an electrical and thermal conductive relationship. The force was calculated to produce a calculated pressure of 1000 p.s.i. on the surface of the semiconductor element.

When the desired force reading was reached, an apertured threaded plug was screwed down within the inner case until sufficient contact was obtained between the plug and the uppermost steel apertured thrust member to retain the desired force reading.

The device was then heated to 200° C. and held at temperature for 16 hours. The device was then cooled to room temperature and disassembled.

Examination of the electrical contact assembly showed that the cushioning member had been deformed to flow about portions of all the surfaces with which it was in contact. The semiconductor element when visually examined, showed no defects. The elements when electrically tested showed no deviation from its designed limitations.

The device was reassembled employing a new electrical contact assembly but fabricated exactly the same as the previous assembly. Upon completion of reassembling, the device was heated to 200° C. and retained at temperature for 168 hours. Upon cooling to room temperature, the device was disassembled and the electrical contact assembly and the semiconductor element examined.

Examination of the cushioning member showed that the cushioning member had been deformed to the same extent as in the previous test at 200° C. Visual examination of the element revealed that no defects had occurred in the semiconductor element. Electrical tests of the semiconductor element revealed the element was still capable of performing very satisfactorily within its designed requirements.

Equally satisfactory test results were realized employing a trifluoromonochloroethylene cushioning member as part of the electrical contact assembly.

While this invention has been shown only in one form, it will be obvious to those skilled in the art that modifications, substitutions and the like may be made therein without departing from its scope.

We claim as our invention:

1. A semiconductor device comprising (1) a body of semiconductor material having (2) a first electrical contact, (3) a second electrical contact and (4) a third electrical contact, the second and third contacts being affixed to the same surface of the body of semiconductor material, (5) a first electrical lead electrically connected to the first contact, (6) a second electrical lead electrically connected to the second contact, (7) a third electrical lead electrically connected to the third contact, (8) an electrical contact assembly disposed between the second lead and the second contact and comprising an apertured, partially deformable cushioning member, the member having a top surface and a bottom surface, a first electrical contact disposed on at least a portion of the top surface of the member and a second electrical contact disposed on at least a portion of the bottom surface of the member, the first and second contacts being in an electrical and thermal conductive relationship with each other, the third electrical lead extending through the aperture of the cushioning member, (6) a first force means exerting a constant force on the second electrical lead whereby the second electrical lead, the first and second electrical contacts disposed on the cushioning member and the second contact are maintained in an electrical and thermal conductive relationship with each other and (7) a second force means applying a constant force on the third electrical lead whereby the third electrical lead and the third contact are maintained in an electrical and thermal conductive relationship with each other.

2. The electrical device of claim 1 in which the material comprising the cushioning member of the electrical contact assembly is one selected from the group consisting of trifluoromonochloroethylene and polytetrafluoroethylene.

3. The electrical device of claim 1 in which the first and second contacts of the electrical contact assembly comprise a unitary electrical contact of a metal selected from the group consisting of copper, gold, silver, nickel, tin, indium and base alloys thereof.

References Cited

UNITED STATES PATENTS

| | | | |
|---|---|---|---|
| 2,641,638 | 6/1953 | Pantchechnikoff | 317—235 |
| 3,192,454 | 6/1965 | Rosenheinrich | 317—234 |
| 3,296,501 | 1/1967 | Moore | 317—234 |
| 3,340,492 | 9/1967 | Kelm | 329—61 |
| 3,350,655 | 10/1967 | Saad | 329—162 |

OTHER REFERENCES

Rudner: "Metal-Surfaced and Other Fluorocarbon Combinations," Electrical Manufacturing, March 1952, pp. 106–110, 284, 286, and 288.

Panaro: "Heat Conducting Vibration and Shock Mount," IBM Technical Disclosure Bulletin, vol. 7, No. 1, June 1964, pp. 113.

JAMES D. KALLAM, Primary Examiner

J. R. SHEWMAKER, Assistant Examiner

U.S. Cl. X.R.

317—234